June 28, 1938. G. F. STINER 2,121,892
GASOLINE METER FOR INTERNAL COMBUSTION ENGINES
Filed Dec. 8, 1936
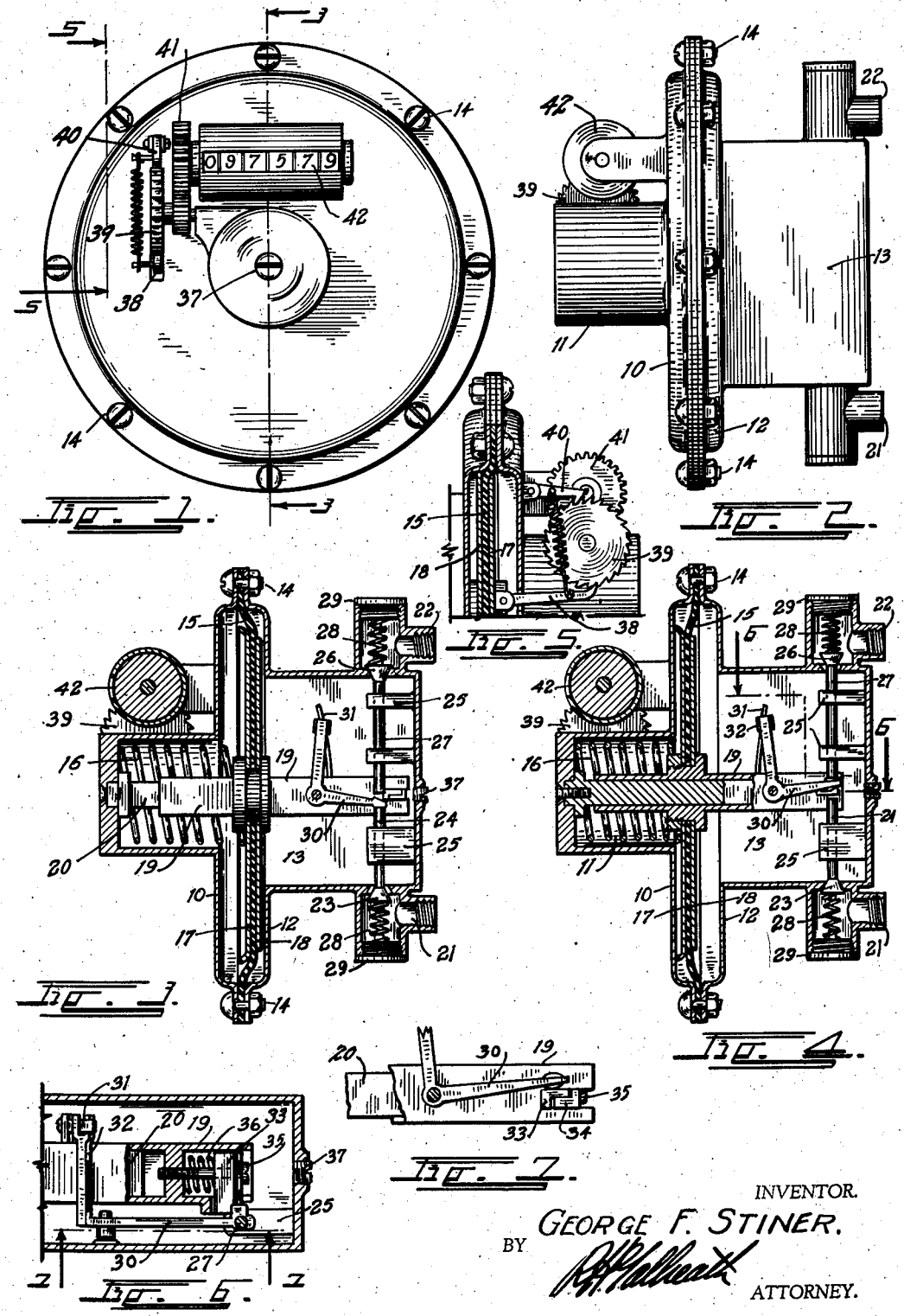
INVENTOR.
GEORGE F. STINER.
BY
ATTORNEY.

Patented June 28, 1938

2,121,892

UNITED STATES PATENT OFFICE 2,121,892

GASOLINE METER FOR INTERNAL COMBUSTION ENGINES

George F. Stiner, Victor, Colo.

Application December 8, 1936, Serial No. 114,800

11 Claims. (Cl. 73—270)

This invention relates to a device for metering the amount of gasoline flowing to the carburetor of an internal combustion engine, and has for its principal object the provision of a small compack, accurate meter which can be placed in the flow line between the gasoline pump and carburetor of an automotive vehicle to indicate directly to the driver thereof the amount of gasoline being consumed by the engine.

Other objects of the invention are to provide a meter of this type in which it will be impossible for the intake valve to open until the discharge valve has closed; in which all stuffing boxes, packing glands, and other sealing devices are eliminated; which will be long lasting, and accurate and positive in its operation; and which will not in any way interfere with the supply of gasoline to the carburetor.

Other objects and advantages reside in the detail construction of the invention, which is designed for simplicity, economy, and efficiency. These will become more apparent from the following description.

While, due to its small compact construction, the meter is particularly applicable for attachment to the instrument boards of automobiles and other automotive vehicles, it is not of course limited to this particular mobile use.

In the following detailed description of the invention reference is had to the accompanying drawing which forms a part hereof. Like numerals refer to like parts in all views of the drawing and throughout the description.

In the drawing:—

Fig. 1 is a front face view of the improved meter.

Fig. 2 is a right side elevation thereof.

Figs. 3 and 4 are vertical sections through the meter, taken on the line 3—3, Fig. 1.

Fig. 3 is a vertical section of the meter taken on the line 3—3, Fig. 1. In this view the meter is shown at the completion of its discharge stroke.

Fig. 4 is a similar view showing the meter at the completion of its intake stroke.

Fig. 5 is a detail section, taken on the line 5—5, Fig. 1.

Fig. 6 is a detail section, illustrating the length-of-stroke adjustment, taken on the line 6—6, Fig. 4.

Fig. 7 is a detail view illustrating a side view of the plunger, taken on the line 7—7, Fig. 6.

The invention comprises a front casing 10, provided with a spring chamber 11, and a rear casing 12, formed with a fluid chamber 13. The casings 10 and 12 are bolted together by means of suitable clamp bolts 14 about the periphery of a disc diaphragm 15 formed of rubber or other flexible composition. The diaphragm 15 is clamped between two stiffening discs 17 and 18 which are secured upon a square, sleeve plunger 19.

The plunger 19 is supported upon and guided by means of a square post 20 which extends inwardly from the head of the spring chamber 11 into the hollow interior of the plunger. A compression spring 16 acts against the diaphragm to constantly force it inwardly. The pressure of the fluid in the chamber 13 acts to force the diaphragm against the action of the spring 16.

The front casing 10 is sealed from the rear casing 12 by means of the diaphragm 15 so that no fluid reaches the front casing and it need not be completely sealed. The fluid is entirely confined to the rear casing 13.

The fluid chamber is provided with an intake fitting 21 and a discharge fitting 22. Both fittings are threaded to receive the extremities of the gasoline tube extending from the fuel pump to the carburetor of an automobile vehicle.

The flow from the fitting 21 to the chamber 13 is controlled by means of an intake valve 23 having a valve stem 24 extending through a guide 25. The flow to the outlet nipple 22 is controlled by means of an outlet valve 26 having a valve stem 27 held in alignment with the valve stem 24 by means of suitable guides 25. Both valves are forced toward the closed position by means of suitable individual valve springs 28. Access to the springs and valves can be had through removable threaded caps 29.

A bell crank lever 30 is pivoted on the interior of the chamber 13 so that one of its arms extends between the extremities of the valve stems 24 and 27. Therefore, reciprocation of the bell crank lever 30 acts to alternately open and close the valves 23 and 26. The reciprocation is imparted by means of a leaf spring 31 mounted upon the sleeve plunger 19. This spring extends upwardly through a bifurcated extremity 32 on the opposite end of lever 30.

Referring to Fig. 3, it will be seen that as the diaphragm moves to the "left," it will cause the spring 31 to reciprocate the lever 30 upwardly to open the valve 26 and allow the valve 23 to be closed by its spring 28. As the diaphragm moves to the "right," the opposite effect is had, that is, the lever 30 moves downwardly, opening the valve 23 and closing the valve 26. There is sufficient "play" or lost motion between the valve stems and the lever so that one valve will completely close before the other valve starts to open.

It is necessary in order to have an accurate metering movement, that the valves be prevented from opening or closing until the diaphragm has reached its extreme movement position. This is accomplished by placing an adjustable lug, consisting of two parts 33 and 34, on the sleeve 19. This lug is in the path of movement of a lug that projects from one side of the lever 30 (Fig. 6) so that the latter cannot move until the sleeve 19 reaches its extreme position.

The length of time that the "lug" (33.34) holds the lever 30 is dependent upon the width of this lug. This width can be regulated as the portion 33 of the lug is stationary on the sleeve 19 and the portion 34 is movable in relation to the portion 33. This movement is accomplished in one direction by means of an adjusting screw 35 and in the other direction by means of a spring 36. Access to the screw 35 is had through a screw plug 37.

Thus, it can be seen that if the screw 35 is tightened or screwed inwardly, it will push the portion 34 toward the portion 33, causing the total width of the lug to be narrowed. If unscrewed, the spring 36 will force the portion 34 to the right, causing the lug to be widened so as to restrain the lever 30 for a larger time period.

The reciprocating movements of the diaphragm and its sleeve plunger 19 are registered by means of a ratchet pawl 38 extending from the plate 17 of the diaphragm through the front housing 10 to actuate a ratchet wheel 39. A stop pawl 40 prevents return movement of the ratchet wheel. The pawls 38 and 40 are connected by means of a common tension spring, as clearly shown in Fig. 5. The ratchet wheel 39 is connected through the medium of suitable gears 41 with an indicator 42. The register 42 is preferably graduated so as to indicate in gallons or fractions thereof the pulstations of the diaphragm 15.

Let us assume that the device is in place on an automobile, and that the gasoline tube from the gasoline pump is connected to the fitting 21 and the tube to the carburetor is connected to the fitting 22. This causes the pump to place a constant pressure in the fitting 21. If the valve 23 is open, the gasoline flows into the chamber 13 exerting a pressure against the diaphragm 15, causing the latter to move to the left. This in turn causes the leaf spring 31 to exert a pressure on the lever 30 causing it to tend to move upward. It can not move upward immediately, however, due to the fact that it is engaged below the lug 33—34.

As soon as the sleeve 19 reaches its extreme movement, however, the lug will pass from over the lug on lever 30, allowing the spring 31 to snap the latter upwardly. The first upward movement brings the intake valve 23 to the closed position and the remaining movement lifts the valve 26, allowing the gasoline to flow to the carburetor as needed under the pressure of the spring 16. The diminishing pressure in the chamber 13 now allows the spring 16 to force the diaphragm toward the right. This causes the spring 31 to exert a downward pressure on the lever 30, forcing it against the top of the lug 33—34, as shown in Fig. 7. As soon as the sleeve 19 reaches its extreme right position, the lever 30 will snap downward past the end of the lug, first closing the valve 26 and then opening the valve 23 for another cycle of operation.

By regulating the screw 35, the amount of gasoline expelled at each stroke can be regulated to bring the metering device to accurate correspondence with the indicator 42.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; the valve stems being axially aligned and spaced apart; a lever positioned between the end of the valve stems to alternately and separately open and close said valves; the distance between the ends of the valve stems being greater than the thickness of the lever, whereby it will engage only one stem at one time; means comprising a spring for reciprocating said lever in consequence of the movement of said diaphragm; and means for delaying the movement of said lever until said diaphragm reaches its extreme positions.

2. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; a lever positioned between said valve stems to alternately and separately open and close said valves, there being sufficient distance between said valves and said lever so that the latter will leave each stem before it contacts the other stem; means for reciprocating said lever in consequence of the movement of said diaphragm; and means comprising a spring for delaying the movement of said lever until said diaphragm reaches its extreme positions; and a manually adjustable means for regulating the period of delay of said delaying means.

3. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; a lever positioned between said valve stems to alternately and separately open and close said valves; means for reciprocating said lever in consequence of the movement of said diaphragm; and means for delaying the movement of said lever until said diaphragm reaches its extreme positions; said means for reciprocating the lever including a plunger projecting from said diaphragm into said chamber and a spring extending from said plunger to said lever so that the movement of said plunger will be resiliently transmitted to said lever.

4. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; a lever positioned between said valve stems to alternately and separately open and close said valves; means for reciprocating said lever in consequence of the movement of said diaphragm; and means for delaying the movement of said lever until said diaphragm reaches its extreme positions; said means for reciprocating said lever including a plunger projecting from said diaphragm into said chamber and a spring extending from said plunger to said lever so that the movement of said plunger will be resiliently transmitted to said lever; said delaying means including a stop member for preventing said lever from moving until said plunger approaches its extreme position so that said spring will be flexed until the final movement of said plunger.

5. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; a lever positioned between said valve stems to alternately open and close said valves; means for reciprocating said lever in consequence of the movement of said diaphragm; and means for delaying the movement of said lever until said diaphragm reaches its extreme positions; said means for reciprocating said lever including a plunger projecting from said diaphragm into said chamber and a spring extending from said plunger to said lever so that the movement of said plunger will be resiliently transmitted to said lever; said delaying means including the plunger, and a lug on the plunger for engaging and preventing said lever from moving until said plunger approaches its extreme position so that said spring will be flexed until the final movement of said plunger; the lug on the plunger projecting into the path of movement of said lever so that the latter can not move until said plunger removes said lug from its path.

6. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; a lever positioned between said valve stems to alternately open and close said valves; means for reciprocating said lever in consequence of the movement of said diaphragm; and means for delaying the movement of said lever until said diaphragm reaches its extreme positions; and means for reciprocating said lever including a plunger projecting from said diaphragm into said chamber and a spring extending from said plunger to said lever so that the movement of said plunger will be resiliently transmitted to said lever; said delaying means including the plunger; a lug on the plunger for engaging and preventing said lever from moving until said plunger approaches its extreme position so that said spring will be flexed until the final movement of said plunger; the lug on the plunger projecting into the path of movement of said lever so that the latter can not move until said plunger removes said lug from its path; and means for varying the position and effective contact of said lug to regulate the delayed period.

7. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves; the stems being axially aligned and spaced apart; a lever positioned between said valve stems to alternately engage the stems to separately open and close said valves; means for reciprocating said lever when said diaphragm reaches its extreme positions; an outer housing closing the outer face of said diaphragm; a spring in said latter housing acting to force said diaphragm inwardly toward said fluid chamber; the means actuated by said diaphragm for alternately reciprocating said lever comprising a guide post extending inwardly toward the diaphragm from said outer housing; a tubular plunger extending through said diaphragm and slidably mounted on said post; and a lug on said tubular plunger for engaging a portion of the lever and delaying the movement thereof and, a resilient means connecting the plunger and the lever for moving the latter when it is released.

8. A device for metering the flow of fluid to the carburetor of an engine comprising: a fluid chamber; a diaphragm closing said fluid chamber; an intake valve for admitting fluid to said chamber; a discharge valve for discharging fluid from said chamber; an independent valve stem for each of said valves: a lever positioned between said valve stems with a lost motion connection to separately and alternately open and close said valves; spring means to force said diaphragm toward said fluid chamber; and means actuated by said diaphragm for alternately opening and closing said valves; comprising said lever and a stationary guide post extending inwardly toward the diaphragm; a tubular plunger extending through said diaphragm and slidably mounted on said post; and a lug on said tubular plunger for delaying the movement of said lever; a spring extending from said tubular plunger to one extremity of said lever, the other extremity being positioned between said intake and outlet valve stems; and means comprising a lug on said plunger for engaging the lever so as to delay the movement thereof until the diaphragm has completed its movement in either direction and the spring has been completely flexed.

9. A metering device for fluids comprising: a diaphragm-actuated rod; a pivoted bell crank lever extending transversely of the rod; a tension spring extending from a point on said rod to one extremity of said lever so that as said rod moves, said spring will exert a pull on said lever in a corresponding direction; an intake valve; an outlet valve; means for transmitting the movement of said lever to said valves, said valves being opposite acting so that movement of the lever in one direction will permit one valve to close and then upon further movement open the other; and means for latching said lever against movement by said spring until the extremities of movement of said rod are reached.

10. A fuel meter for engines comprising: two concave diaphragm shells; a diaphragm clamped between said shells; a diaphragm rod extending through both shells and through said diaphragm and sealed to the latter; means for operating a counting device from said diaphragm rod; a valve housing extending from one of the shells about said rod; an intake passage opening into said valve housing; a discharge passage opening into said valve housing opposite said intake passage; an intake valve controlling said intake passage; an outlet valve controlling said outlet passage, said valves being oppositely acting;

means comprising a pivoted valve lever cooperating with said valves so that as it swings, it will alternately open and close the same; and a tension spring extending from the diaphragm rod to the free extremity of said valve operating lever so as to swing the latter in consequence of movement of said rod; and means for preventing said lever from moving until said rod reaches its extreme positions.

11. A fuel meter for engines comprising: two concave diaphragm shells; a diaphragm clamped between said shells; a diaphragm rod extending through both shells and through said diaphragm and sealed to the latter; means for operating a counting device from said diaphragm rod; a valve housing extending from one of the shells about said rod; an intake passage to said valve housing; a discharge passage from said valve housing; an intake valve controlling said intake passage; an outlet valve controlling said outlet passage, said valves being oppositely acting; a pivoted valve lever cooperating with said valves so that as it swings, it will alternately and separately open and close the same; a tension spring extending from said rod to the free extremity of said valve operating lever so as to swing the latter in consequence of movement of said rod; the diaphragm rod having a latch lug; a lug on the valve operating lever positioned to engage the lug on the rod to hold the lever from movement, the interengaging lugs disengaging when the diaphragm rod reaches the limits of its movement in either direction.

GEORGE F. STINER.